_(12)_ United States Patent
Chang et al.

(10) Patent No.: US 12,277,172 B2
(45) Date of Patent: Apr. 15, 2025

(54) GRAPH CREATION FROM MULTIPLE DATABASES

(71) Applicant: GraphSQL, Inc., Redwood City, CA (US)

(72) Inventors: Xinyu Chang, Menlo Park, CA (US); Yu Xu, Millbrae, CA (US); Zixuan Zhuang, Redwood City, CA (US); Mingxi Wu, San Mateo, CA (US)

(73) Assignee: TigerGraph, Inc., Redwood City, CA (US)

( * ) Notice: Subject to any disclaimer, the term of this patent is extended or adjusted under 35 U.S.C. 154(b) by 327 days.

(21) Appl. No.: 16/223,328

(22) Filed: Dec. 18, 2018

(65) Prior Publication Data

US 2020/0192938 A1   Jun. 18, 2020

(51) Int. Cl.
*G06F 16/901*  (2019.01)
*G06F 16/903*  (2019.01)

(52) U.S. Cl.
CPC .... *G06F 16/9024* (2019.01); *G06F 16/90335* (2019.01)

(58) Field of Classification Search
CPC ................ G06F 16/9024; G06F 16/90335
See application file for complete search history.

(56) References Cited

U.S. PATENT DOCUMENTS

| | | | |
|---|---|---|---|
| 10,657,125 B1* | 5/2020 | Gautam | G06F 40/40 |
| 2016/0055184 A1* | 2/2016 | Fokoue-Nkoutche | G06F 16/213 707/809 |
| 2018/0011887 A1* | 1/2018 | Rozenwald | G06F 16/9024 |
| 2018/0136830 A1* | 5/2018 | Kindelsberger | G06F 3/04847 |
| 2019/0005025 A1* | 1/2019 | Malabarba | G06F 40/295 |

* cited by examiner

*Primary Examiner* — Brittany N Allen
*Assistant Examiner* — William P Bartlett

(57) ABSTRACT

Systems, methods, and software described herein provide operations to generate and manage a graph. In one implementation, a graph management system may identify a request to generate a graph from multiple databases. In response to the request, the graph management system may identify attributes of interest in the databases and generate vertices that correspond to the attributes of interest. As the new vertices are generated, the graph management system may determine attributes that are related to the same entity, generate entity vertices that correspond to the entities identified in the databases, and generate edges that connect the attribute vertices to the corresponding entity vertices.

17 Claims, 9 Drawing Sheets

GRAPH CREATION FROM MULTIPLE DATABASES

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called edges or lines. The edges establish relationships (connections) between the vertices. Graphs can be directed or undirected. In an undirected graph, an edge from point A to point B is considered to be the same as a line from point B to point A. In a directed graph, the two directions are treated as distinct directed edges.

Although graph databases provide an efficient manner for storing data, difficulties can arise in generating graphs using data from multiple databases or data sources. As an example, different databases may contain different information, which may cause difficulties when trying to construct a single graph from the databases. The issues are often compounded in maintaining a format for the graph, such that information is readily searchable from the vertices and edges located therein.

Overview

Provided herein are enhancements to managing graph indexing for a graph database. In one implementation, a graph management system may obtain a request to generate a graph from multiple databases, wherein the databases may maintain various attributes that correspond to different entities. In response to the request, the graph management system may identify attribute types of interest for the databases and, for each attribute type of interest, generate a vertex in the graph for each unique attribute identified in the databases related to the attribute type of interest. Once the vertices are added to the graph, the graph management system may, for each of the vertices, identify whether the vertex is associated with one or more other vertices based on associations in the databases and, when the vertex is associated with one or more other vertices, connect the vertex and the one or more other vertices to an entity vertex that is representative of the corresponding entity.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Examples herein provide enhancements for generating and maintaining a graph from one or more databases. In some implementations, a graph management system may maintain a graph database that stores one or more graphs, wherein each of the graphs store data in the form of vertices and edges, where a vertex represents a data instance, and an edge represents a relationship of some type between any two vertices. In some implementations, each of the vertices may comprise attributes that provide information about the particular data instance. For example, a graph may represent friendships between users of a social network, wherein the vertices may include user information or attributes, such as username, birthday, age, profession, or some other similar information, and the edges may indicate which users are friends.

In the present implementation, a graph management system may provide functionality to generate a graph from multiple databases, where the databases may store attributes of various entities (users, equipment, buildings, or some other entity). Each of the entities may be associated with multiple unique identifiers. For example, if the databases included information about employees of an organization, each of the employees may be associated with a unique social security number, phone number, email, or some other unique identifier. When a request is generated to create a graph, the graph management system may identify attribute types of interest, or attribute types representative of unique identifiers, and may initiate operations to identify unique attributes of the attribute types of interest. When a unique attribute value is identified, the graph management system may generate a new vertex that corresponds to the attribute value.

After generating a new vertex, the graph management system further determines whether the new vertex is associated with one or more other attribute vertices based on the databases. In some examples, when a vertex is added, the graph management system may traverse the rows that the attribute value appeared to determine if other attribute vertices are associated with the new vertex. If other vertices are associated with the new vertex, the vertices may be connected via an entity vertex that represents the entity associated with the attributes. Thus, if a social security number, email, and phone number were all shared by the same employee (example entity), the employee may be represented as an entity vertex that is connected to vertices that represent the social security number, email, and phone number. If the graph management system does not identify any related or associated attribute vertices to a new attribute vertex then a new entity vertex may be generated that is connected to the attribute vertex.

Figure 1:
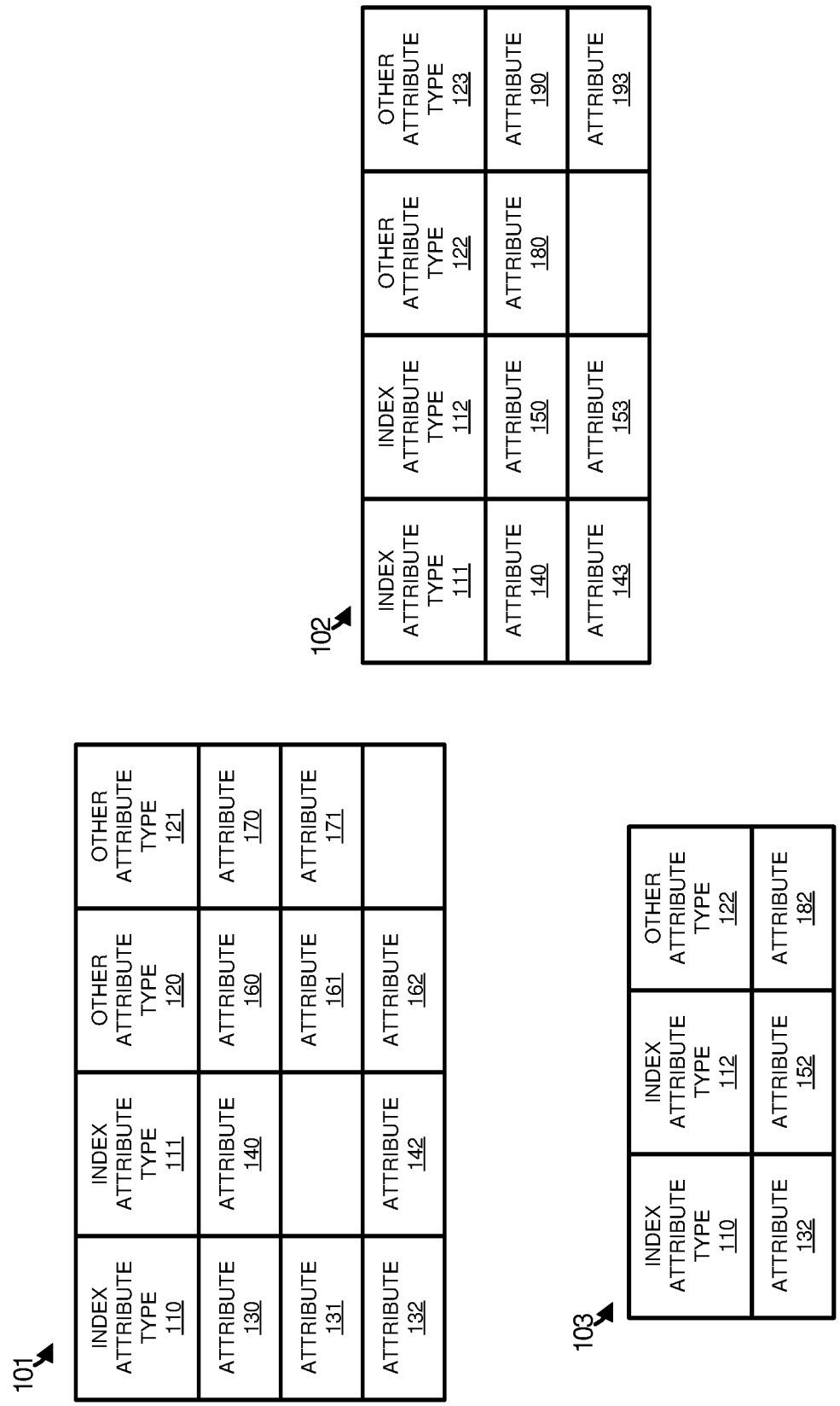
FIG. 1 illustrates databases that maintain attributes for multiple entities according to an implementation.

FIG. 1 illustrates databases 101-103 that maintain attributes for multiple entities according to an implementation. Database 101 includes columns for index attribute types 110-111 and other attribute types 120-121, database 102 includes index attribute types 111-112 and other attribute types 122-123, and database 103 includes index attribute type 110 and 112 and further includes other attribute type 122. In some implementations, databases 101-103 may comprise relational databases that can be maintained by one or more different services or systems.

In operation, databases, such as relational database structures may be used to maintain information about multiple entities, wherein the entities may comprise users, employees, infrastructure, equipment, or some other similar entity. The information maintained about the entities may include unique identifier attributes for the entity, as well as other information about an entity. As an example, databases 101-103 may represent attributes of different employees of an organization. Accordingly, unique identifier attributes for the employees may comprise the social security number of the employee, the phone number for the employee, the email of the employee, or some other similar attribute that is unique to the particular employee. Additionally, databases 101-103 may include other information about the employee, including the name of the employee, the occupation of the employee, the birthday of the employee, or some other similar information. Here, the unique identifiers for an entity may be represented as index attribute types 110-112, and the other attributes may be represented by other attribute types 120-123.

As databases 101-103 are maintained, a graph management system may identify a request to generate a graph from the one or more databases. In some implementations, in generating the graph, the graph management system may identify attribute types of interest for the graph and generate the graph using the attribute types of interest. In some examples, the attribute types of interest may be defined by an administrator or user of the graph management system. In some implementations, the attribute types of interest may be identified and correspond to unique identifiers for entities represented in the graph. Returning to the example of employees in an organization, the attributes of interest may comprise usernames, social security numbers, phone numbers, emails, or some other unique identifier type that is associated with an individual employee. Referring to the example of databases 101-103, these attributes of interest may correspond to indexing attributes 110-112, wherein the indexing attributes may be used to identify a specific entity of the organization. For instance, using a combination of databases 101-103 an entity may include attribute 132, attribute 142, attribute 152, attribute 162, and attribute 182, wherein attributes 132, 142, and 152 may be unique to the particular entity and used in indexing the entity in a graph.

Figure 2:
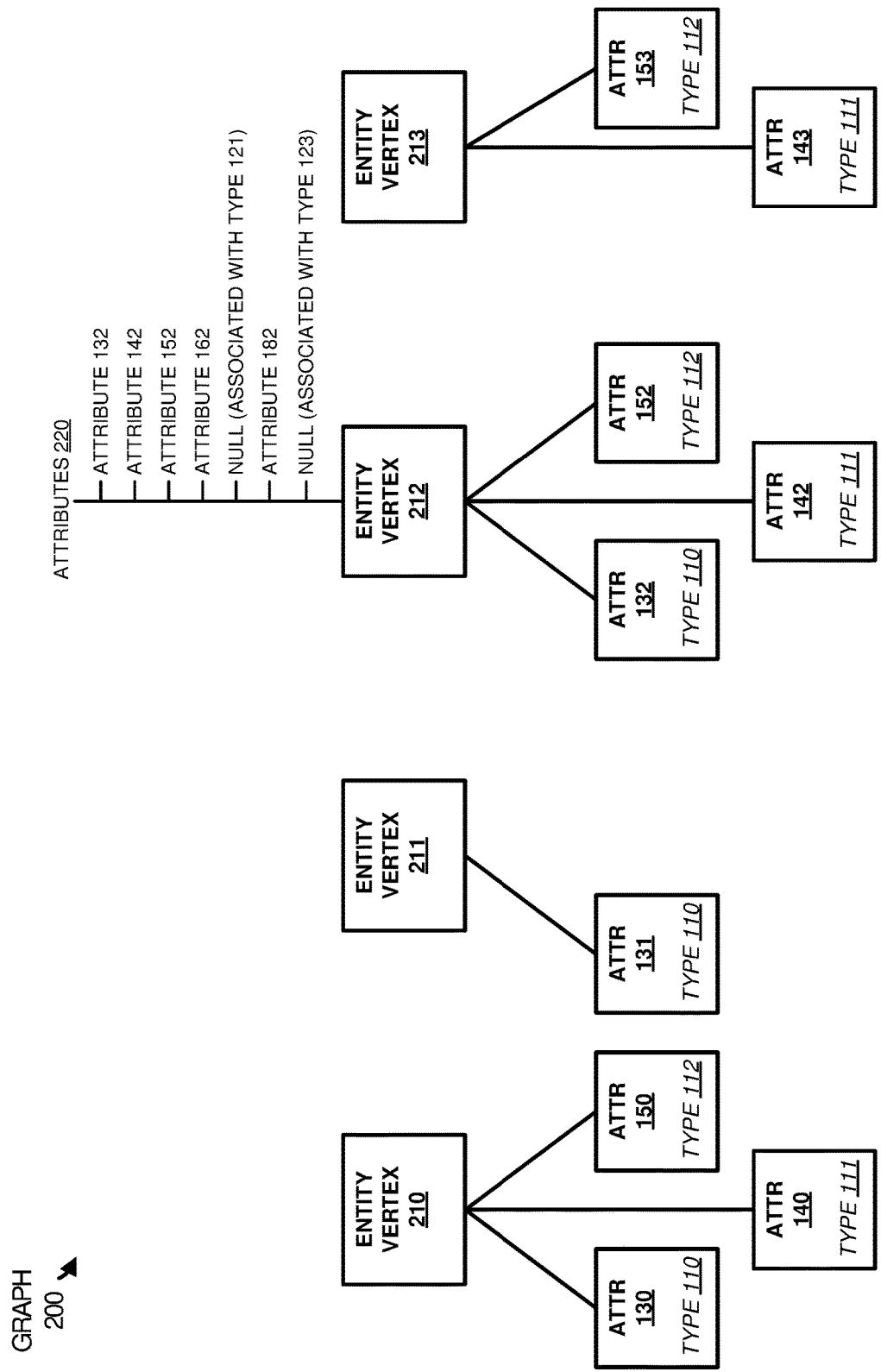
FIG. 2 illustrates a graph generated from databases according to an implementation.

FIG. 2 illustrates a graph 200 generated from databases 101-103 according to an implementation. Graph 200 includes entity vertices 210-213, and further demonstrates an expanded version of attributes 220 that corresponds to entity vertex 212. Graph 200 further includes vertices representative of attributes 130-132 of attribute type 110, attributes 140 and 142-143 of attribute type 111, and attributes 150, 152, and 153 of attribute type 112.

As described herein, when a request is generated to create graph from multiple databases, a graph management system may process the databases to identify attributes that correspond to attribute types of interest. Here, the attribute types of interest correspond to index attribute types 110-112. Consequently, when the request is generated for the new graph, for each attribute type of interest, the graph management system may identify any unique value associated with the attribute type of interest. For example, index attribute type 110 includes unique attributes 130-132 that can be identified from databases 101-103. As the unique attributes are identified that correspond to index attribute type 110, the unique attributes may be added to the graph as corresponding vertices. Similar operations may also be provided to index attribute types 111-112, wherein the graph management system may identify unique attribute values for each of attribute types and add corresponding vertices in graph 200.

As the index attribute vertices are added to graph 200, the graph management system may determine whether one or more vertices correspond to the same entity based on associations in the plurality of databases. Referring to the example, of entity vertex 212, attributes 132, 142, and 152 may be identified to correspond to the same entity vertex using databases 101 and 103, where attribute 132 is associated with attribute 142 in database 102 and attribute 132 is associated with attribute 152 in database 103. Once the corresponding or related vertices are identified, the related vertices may be coupled via entity vertex 212, which may also store additional information regarding the particular entity.

In some implementations, in generating graph 200, a graph management system may traverse each of the databases to identify attributes that correspond to the attribute types of interest. When an attribute is encountered that corresponds to an attribute type of interest, the graph management system may determine whether the attribute was previously encountered or is not considered unique. If the attribute is considered unique, then the attribute may be added to graph 200 as a corresponding vertex. Once added, the graph management system may determine whether any other attribute vertices in graph 200 correspond or are related to the added vertex based on associations in databases 101-103 (e.g., in the same row as the identified unique value). If one or more vertices are related or correspond to the new vertex, then the graph management system may generate a link to the entity vertex that corresponds to the related vertices. For example, when the graph management system processes databases 101-103 and initiates a traversal of database 103, the graph management system may generate a vertex for attribute 152, which is a unique and new attribute, and may further identify that attribute 152 is related to at least attribute 132 based on the row of database 103. Consequently, a new edge may be generated that links the vertex for attribute 152 to entity vertex 212 that was previously generated for attribute 132. Advantageously, rather than determining all of the attributes related to a newly identified attribute, the system may identify a single related attribute and generate an edge that corresponds to the entity vertex for the single related attribute. Thus, without the use of another database to determine that attribute 142 is related to attribute 152, by traversing each of the databases, additional attributes may be added to an entity vertex as they are identified.

Figure 3:
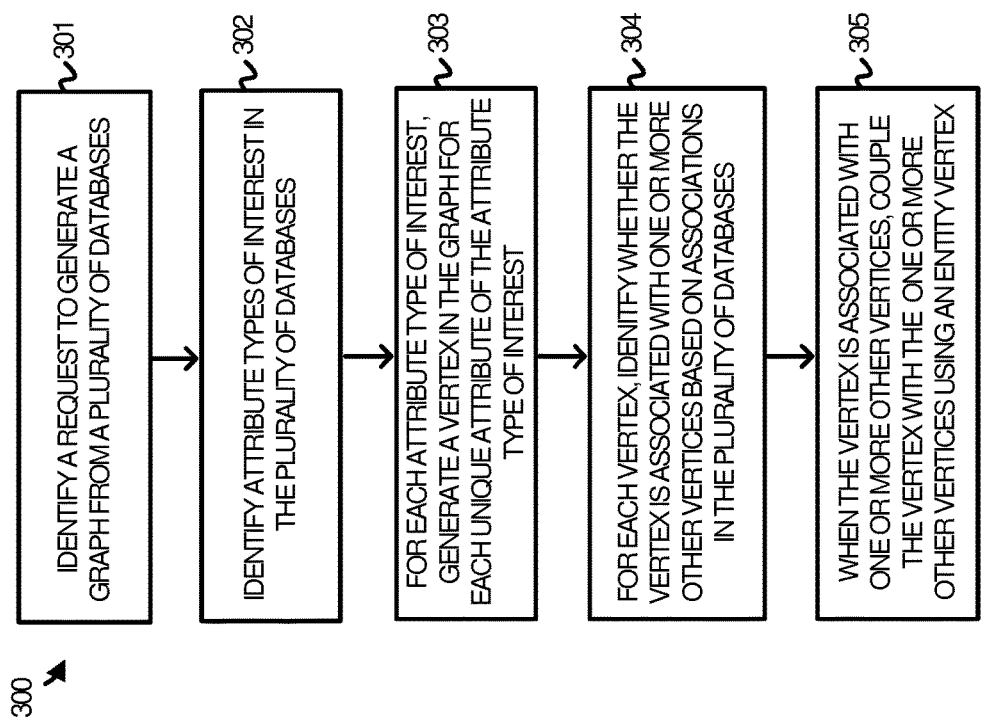
FIG. 3 illustrates an operation of a graph management system to generate a graph from multiple databases according to an implementation.

FIG. 3 illustrates an operation 300 of a graph management system to generate a graph from multiple databases according to an implementation. The processes of operation 300 are referenced parenthetically in the paragraphs that follow with reference to databases 101-103 and graph 200 of FIGS. 1 and 2.

As depicted in FIG. 3, operation 300 includes identifying (301) a request to generate a graph from a plurality of databases. In some implementations, the request may be generated by an administrator or user associated with the databases, where the databases may comprise relational databases that store data in one or more rows and columns. In response to the request, the graph management system may identify (302) attribute types of interest in the plurality of databases. In some examples, the administrator or user that initiates the request for the graph may provide input indicating the attribute types of interest for the graph. In other implementations, the attribute types of interest may be identified based on metadata associated with each of the databases, wherein the metadata may define attributes of interest. In some examples, the attribute types of interest may correspond to individual identifiers for entities in the one or more databases. For instance, databases 101-103 may be used to provide information about employees of an organization. As a result, the attribute types of interest may correspond to unique identifiers for each of the employees, such as usernames, social security numbers, phone numbers, emails, or some other similar information that can be used to distinguish between the various employees.

Once the attribute types of interest are identified, the graph management system may, for each attribute type of interest, generate (303) a vertex in the graph for each unique attribute of the attribute of interest. For example, the graph management system may traverse databases 101-103 and identify all unique attributes associated with index attribute type 110, wherein the unique attributes comprise unique attributes 130-132. When generating the vertices for attributes 130-132, only a single corresponding vertex is generated per attribute. Thus, while attribute 132 appears in both database 101 and database 103, a single vertex may be generated in the graph that corresponds to attribute 132.

As the vertices are added to the graph, the graph management system may, for each of the added vertices, identify (304) whether the vertex is associated with one or more other vertices based on associations in the plurality of databases. As an example, the graph management system may travers each of the databases 101-103 a row at a time and when a new unique attribute is identified for an attribute of interest, a vertex may be generated that corresponds to the new attribute. Further, the graph management system may determine whether the new vertex is associated with any other vertices for a particular entity. Thus, when processing database 101, the graph management system may initially identify attribute 130 for an entity and further identify attribute 140 for the same entity because the values are located in the row of database 101. Once identified, the vertices that are located in graph 200 may be considered associated with the same entity due to their location in the same row of the database. After identifying associated vertices with a current vertex, the graph management system may couple (305) the vertex with the other associated vertices using an entity vertex associated with an entity. For example, when processing database 103, the graph management system may determine that attribute 152 is associated with attribute 132. Consequently, attribute 152 may be coupled or associated with attribute 132 in graph 200 using a common entity vertex 212, wherein vertex 212 is representative of an entity, such as an employee, associated with the attributes.

In some implementations, when an attribute value for an attribute of interest is identified in databases 101-103 other vertices may not exist in graph 200 that are associated with the attribute. Consequently, a new entity vertex may be generated that is not coupled to any other attribute vertices. Referring to an example in graph 200, when attribute 131 is identified in database 101, the graph management system may generate entity vertex 211 that corresponds to the entity associated with attribute 131. Once generated, if a database is updated or another attribute is identified that is associated with entity vertex 211 and attribute 131, a new vertex may be generated with the new attribute and coupled to entity vertex 211 using an edge.

Although not used as an indexing attribute or attribute of interest, it should be understood that a graph management system may further add other attribute types 120-123 to graph 200. In particular, when an entity vertex is generated, metadata may be stored as part of the vertex that indicates the various attributes associated with the graph. An example is represented for entity vertex 212, where entity vertex 212 include attributes 132, 142, 152, 162, and 182 that are identified for the entity. Additionally, the entity vertex may maintain information about the attributes that are not available or may include a "NULL" attribute indicating that an attribute value for the attribute type has not been provided. In the example of entity 212, attribute values have not been provided for attribute type 121 or attribute 123, resulting in "NULL" value representations in graph 200.

Once a graph is generated, queries to the graph may be made more efficient with the use of the attribute vertices associated with the attributes of interest. In particular, while not all entities may have all of the attributes of interest, a query may be generated using any known attribute of interest and may obtain any other attributes associated with an entity. As an example, if a query was generated for entity vertex 212, any one of attributes 132, 142, or 152 may be used to search graph 200 and determine one or more other attributes for the entity. These attributes may comprise attributes of interest (represented as other vertices) or may comprise other attributes that are stored as metadata with entity vertex 212. Thus, rather than individually searching multiple databases to identify information about a particular entity, the generation of graph 200 may permit queries using any of the known individual identifiers for an entity and determine other information associated with the entity.

Figure 4A:
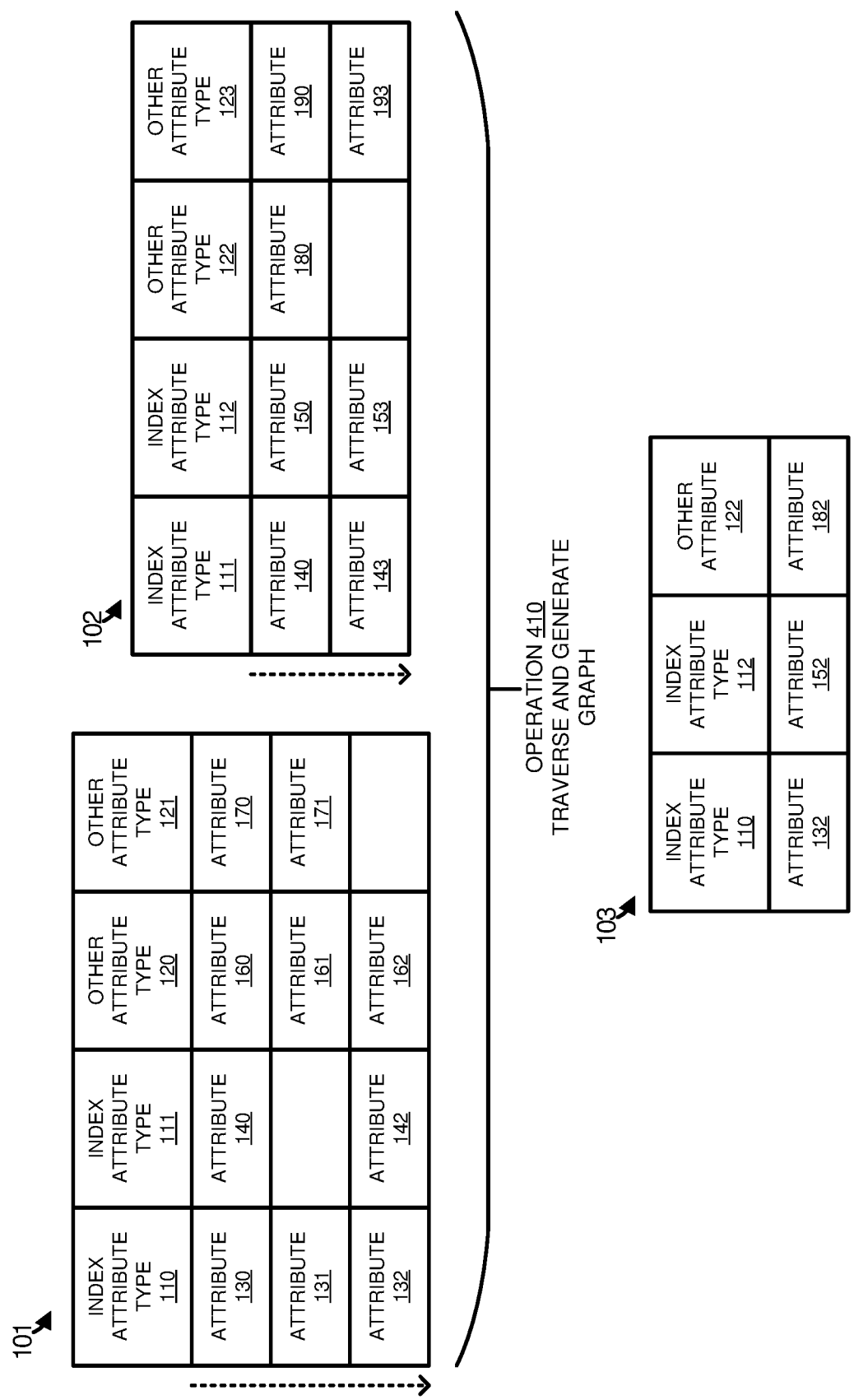
FIGS. 4A-4D illustrate the generation of a graph from multiple databases according to an implementation.
Figure 4B:
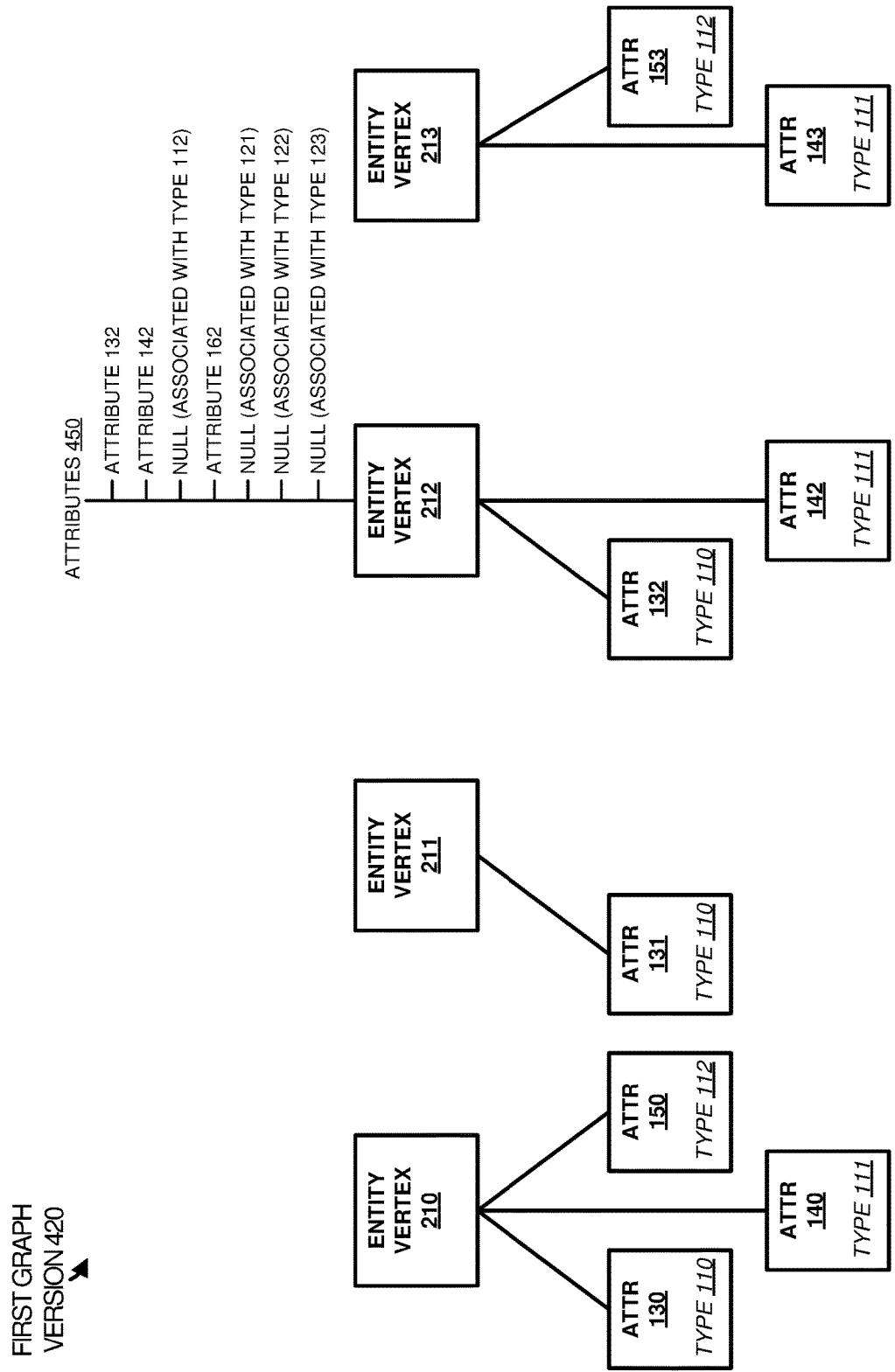
Figure 4C:
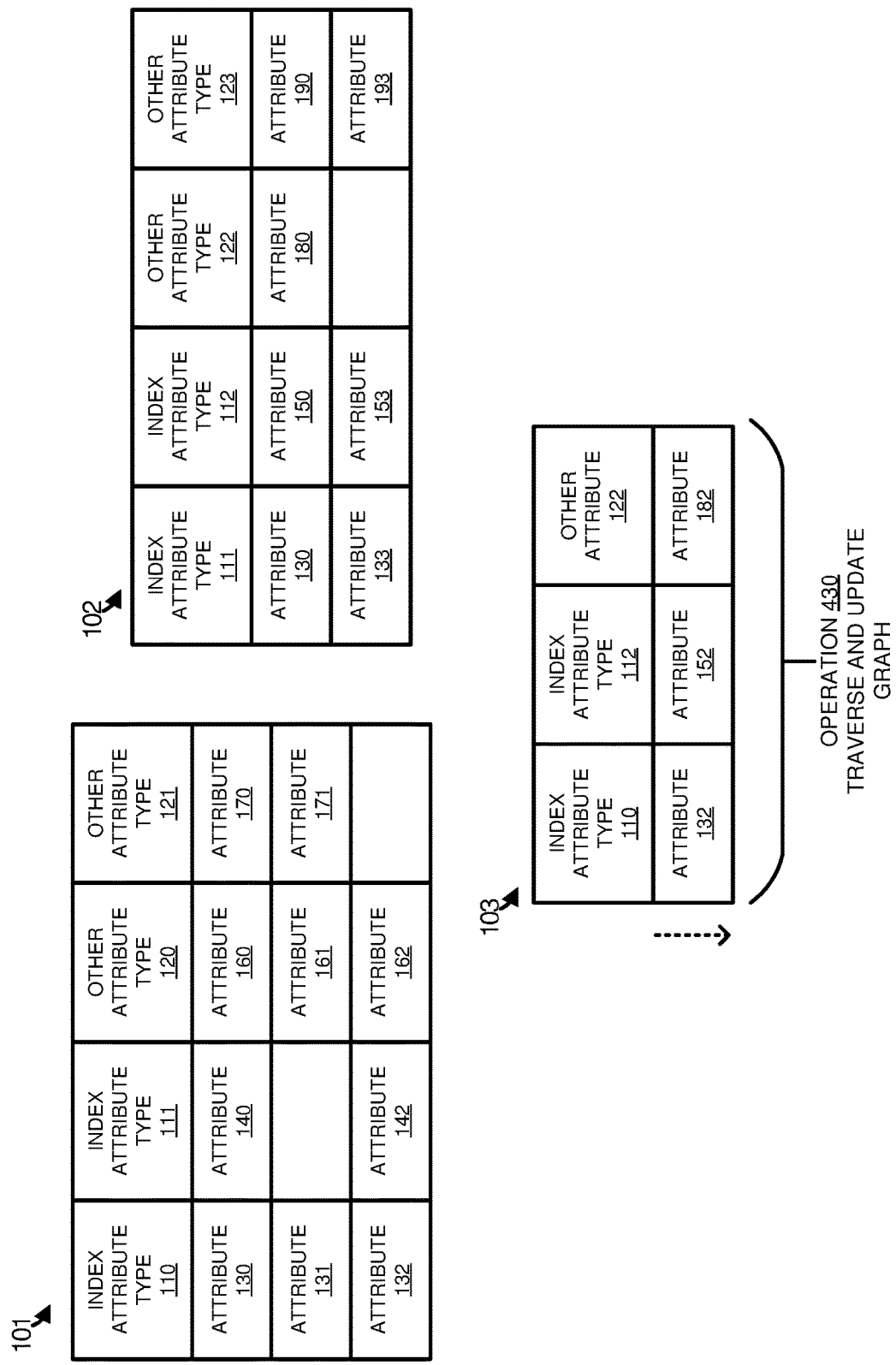
Figure 4D:
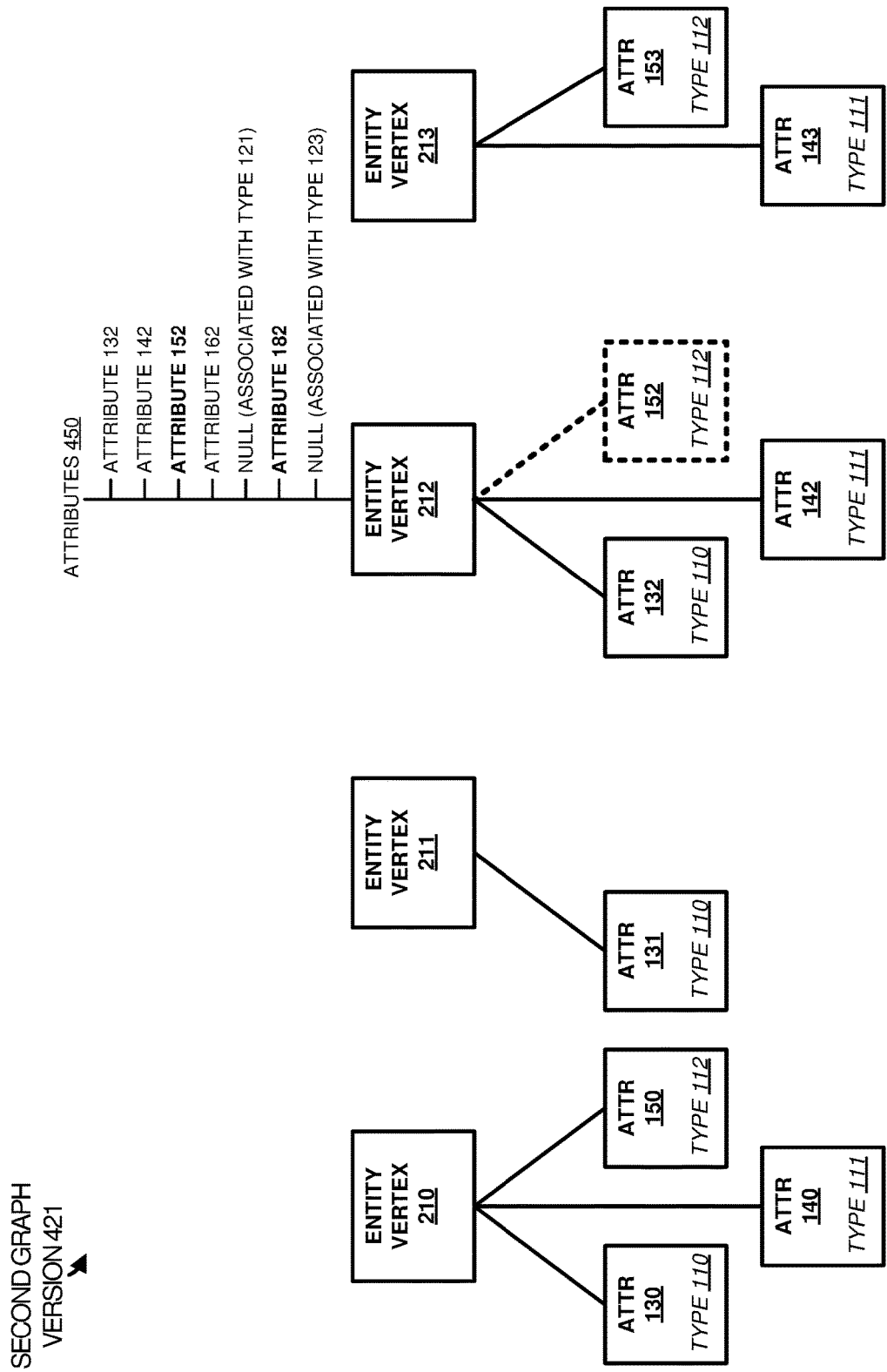

FIGS. 4A-4D illustrate the generation of a graph from multiple databases according to an implementation. FIGS. 4A and 4C include databases 101-103 from FIG. 1, while FIGS. 4B and 4D include vertices associated with graph 200 of FIG. 2.

Referring first to FIG. 4A, FIG. 4A includes databases 101-103 that are representative of relational databases that store attributes for entities using columns and rows. As the data is maintained in databases 101-103, a user or administrator associated with the data may generate a request to create a graph from the data in databases 101-103. In response to the request, the graph management system may identify attribute types of interest in databases 101-103, wherein the attribute types of interest may comprise unique identifier types associated with the entities represented in databases 101-103. For example, in an organization, the unique identifiers may be used to identify employees, wherein the identifier types may comprise usernames, social security numbers, emails, phone numbers, and the like. In the example of FIG. 4A, attributes of interest are represented as index attribute types 110-112, which can be used to identify the corresponding entities.

Once the attributes of interest are identified, the graph management system may initiate operation 410 to traverse and generate a graph for the databases. Here, the graph management system may initially traverse databases 101-102 to generate first graph version 420 that is represented in FIG. 4B. In particular, the graph management system may traverse or step through each row in a database to identify attributes associated with entities represented in databases 101-102. When a unique attribute associated with an attribute of interest is identified (any of index attribute types 110-112), the graph management system may generate a new vertex in the graph that corresponds to the new unique attribute. For example, when traversing database 101, the graph management system may encounter attribute 130, which represents a new unique value for index attribute type 110. As a result, the graph management system will generate a new vertex that corresponds to attribute 130.

Additionally, when a new vertex is generated, the graph management system will determine whether the vertex is related to any other vertices that have already been generated for the graph based on databases 101-103. As an example, when the graph management system encounters attribute 140 as index attribute type 111 in database 101, the graph management system may add attribute to the graph as it is a new unique attribute value associated with index attribute type 111. Once added, the graph management system may use the information in database 101 (as well as information from other databases) to determine whether attribute 140 is associated with any other vertex associated with an attribute of interest. Here, because attribute 140 is in the same row as attribute 130, the graph management system may determine that attribute 140 is associated with attribute 130. Once the related attribute is identified, and both attributes 130 and 140 are added as vertices in the graph, the vertices for attributes 130 and 140 may be coupled by another entity vertex 210 that represents the entity for both attributes 130 and 140.

In some implementations, when an attribute value for an attribute of interest is identified that does not correspond to another attribute in the graph, the graph management system may generate a new entity vertex that represents the entity and connect the vertex for the attribute to the new entity vertex. Referring to an example from database 101, when the graph management system parses database 101 and encounters attribute 131, a vertex may be generated that corresponds to attribute 101, however, no value exists for index attribute 111 in database 101. As a result, when the vertex is added that corresponds to attribute 131, a new entity vertex 211 is added to the graph that corresponds to the entity for attribute 131.

Although described in the previous examples as adding vertices that represent attributes of interest, the graph management system may further add attributes to the graph that represent other attributes of the entities. Referring to first graph version 420 in FIG. 4B, metadata may be stored with each entity vertex of entity vertices 210-213 that indicates the various attributes that have been identified for the vertex. After processing databases 101-102, the graph management system has identified attributes 450 that correspond to attributes 132, 142, and 162. The other attributes may be empty or provided with a "NULL" attribute until an attribute of the associated attribute type is identified.

Referring now to FIG. 4C, FIG. 4C demonstrates the continued operations of adding vertices and edges to a graph to reflect information from different databases. Here, operation 430 is provided that processes the attributes that are stored as part of database 103. These attributes include attribute 132, which is also associated with attribute 152 and attribute 182. From these attributes, the graph management system may identify the attributes that correspond to attribute types of interest, in this example attributes 132 and 152, and determine if either of the attributes comprise a new unique value. In the example of attribute 132, attribute 132 was previously identified in database 101, and consequently is not eligible for a new vertex in the graph. In contrast, attribute 152 that corresponds to index attribute type 112 is a new unique value, which causes the graph management system to add a new vertex to the graph that corresponds to attribute 152. Additionally, attribute 182 may be added to the graph as part of corresponding entity vertex 212, where attributes 182 and 152 may appear in the metadata for vertex 212 that is demonstrated in second graph version 421 of FIG. 4D.

In some implementations, while the graph management system may initially process databases to generate a graph, it should be understood that the graph may be dynamically updated based on additions, modifications, and deletions to the databases. In particular, when an update is identified to a database, the graph management system may process the update to identify relevant attributes and update the graph as described herein based on the identified attributes.

In some examples, when determining whether a first unique attribute of a first type is related to one or more attributes of second types, the graph management system may identify every row in the databases in which the first unique attribute is stored. From the rows, the graph management system may determine whether one or more other attributes are located in the same row. If one or more other attributes are located in the same row and are of a second attribute type of interest, then the first attribute may be considered associated or related to the one or more other attributes. In some implementations, the graph management system may traverse the databases one row at a time, causing the identified relationships between attributes to be modified as additional rows are processed. Thus, while an attribute may not initially be identified as related to any other attributes, as additional rows of the databases are processed, additional attribute associations may be identified for the attribute.

Figure 5:
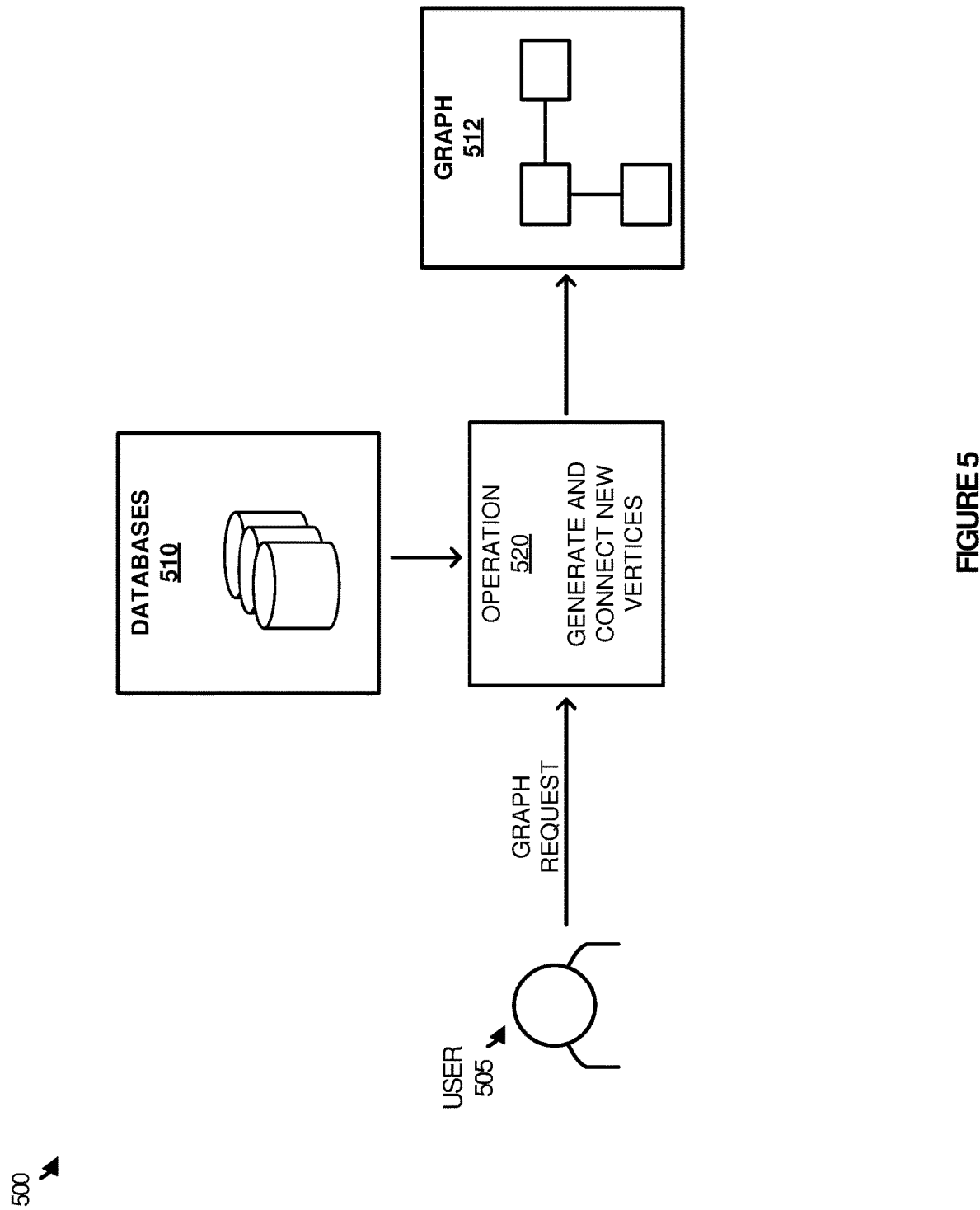
FIG. 5 illustrates an operational scenario of generating a graph from multiple databases according to an implementation.

FIG. 5 illustrates an operational scenario 500 of generating a graph from multiple databases according to an implementation. Operational scenario includes user 505, databases 510, graph 512 and operation 520, which may be executed by a graph management system.

In operation, user 505 generates a request that is identified by the graph management system to generate graph 512 from databases 510. In generating the request, the user may provide information about databases 510, including any accessibility information (username, passwords, addressing, and the like) and may further provide information about the attribute types of interest within the database. In some implementations, the attribute types of interest may be identified based on whether the attribute type is associated with a unique identifier for an entity, wherein the entity may comprise a person, equipment, a location, or some other similar entity. As an example, the attribute types of interest for a person may be provided by user 505 or may be identified from databases 510 based on whether the attribute type comprises a unique identifier for the user, such as a username, email, social security number, or the like.

Once the request is generated, operation 520 is executed to generate and connect vertices for graph 512 from databases 510. In some implementations, operation 520 may identify attributes corresponding to the attribute types of interest, and for each unique attribute value identified, a new vertex may be added to graph 512 that corresponds to the attribute value. In addition to adding vertices that correspond to the identified attributes, operation 520 may further determine whether an attribute is associated with other attributes represented as vertices in the graph. If there is exists an association between vertices, which can be determined from databases 510, then the associated vertices may be coupled via an entity vertex that represents the entity that corresponds to the associated attributes. For example, if databases 510 indicated that a social security number was related to or associated with an email, both the social security number vertex and the email vertex may be connected to a third vertex that represents that entity associated with the attributes. In some implementations, a vertex that represents an attribute may be added to the graph but may not be associated with any other vertices in the graph. As a result, when the vertex is added, operation 520 may generate another new vertex that is representative of an entity vertex for the attribute.

In some implementations, when attribute vertices are initially added to a graph, the graph management system may be incapable of determining that the attributes are related. For example, a first attribute may be identified in a first database, while a second attribute may be identified in a second database. As a result, the graph management system may generate a first entity vertex for the first attribute and may generate a second entity vertex for the second attribute. However, when the graph management system traverses a third database, the graph management system may determine that the first attribute and the second attribute are associated with the same entity. Consequently, the graph management system may merge the first and second entity vertices based on the information from the third database.

In some examples, while traversing the databases to generate graph 512, operation 520 may encounter conflicting data for each of the entities. For example, in an organization of employees, an employee's phone number may be listed as a first value in a first database and listed as a second value in a second database. In resolving the conflict, the graph management system may select the proper data based on what data was encountered most often (e.g., the data that was most frequently encountered across databases), the data that was encountered in primary databases over other databases, the data that was encountered first, the data that was encountered last, or some other selection process for conflicting data. In some examples, the conflict resolution procedures may be selected by user 505 when the request is generated for graph 512. In some implementations, the graph may include both values rather than resolving the conflict and may notify a user that multiple values were detected. Once notified the user may select a value or may maintain both values in the graph.

After graph 512 is generated, queries may be generated to graph 512 using the created vertices from the attributes of interest. As a result, when the attributes of interest are associated with unique identifiers for entities, queries may use any known unique identifier to determine other information associated with an entity. Thus, if graph 512 were representative of an organization's employees, then any known identifier for an employee may be used to determine additional information about the employee. This additional information may include other identifiers for the employee, as well as other attributes, such as the age of the employee, the office location of the employee, or some other information that might not be a unique identifier associated with the employee.

Figure 6:
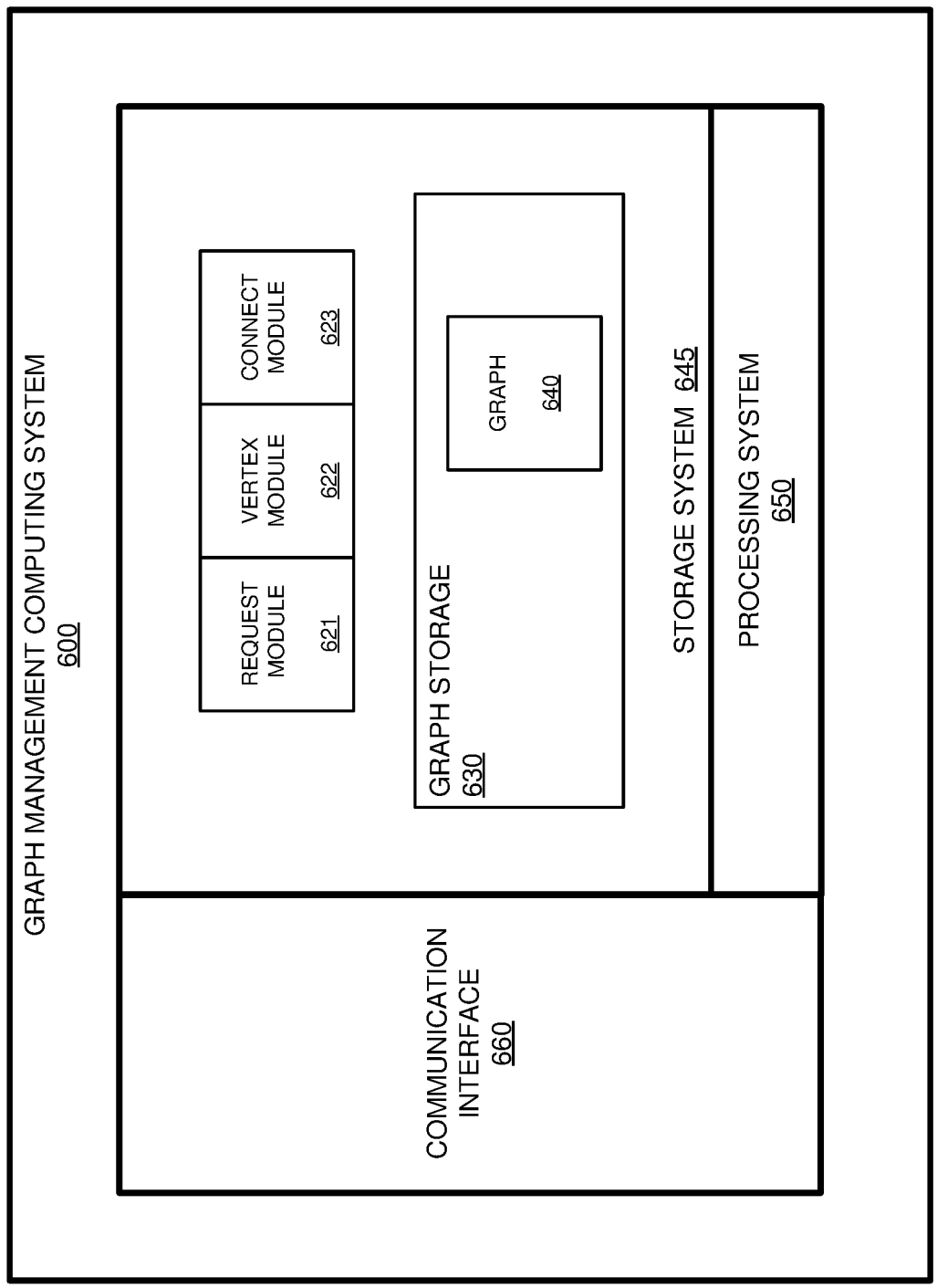
FIG. 6 illustrates a graph management computing system according to an implementation.

FIG. 6 illustrates a graph management computing system 600 according to an implementation. Graph management computing system 600 is representative of any computing system or systems with which the various operational architectures, processes, scenarios, and sequences disclosed herein for a graph management system can be implemented. Graph management computing system 600 includes storage system 645, processing system 650, and communication interface 660. Processing system 650 is operatively linked to communication interface 660 and storage system 645. Communication interface 660 may be communicatively linked to storage system 645 in some implementations. Graph management computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more end user computing systems in some implementations, wherein the communication interface may transfer and receive information related to graphs in graph storage 630.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises request module 621, vertex module 622, and connect module 623, wherein storage system 645 further includes graph storage 630 for graph 640. The operating software on storage system 645 may further include an operating system, utilities, drivers, network interfaces, applications, or some other type of software. When read and executed by processing system 650, the operating software on storage system 645 directs graph management computing system 600 to operate as described herein.

In one implementation, request module 621 directs processing system 650 to identify a request to generate a graph from one or more databases. In response to the request, vertex module 622 may traverse the databases and add new vertices that each correspond to a unique attribute value of attribute types of interest. These attribute types of interest may correspond unique identifier types for entities represented in the databases, wherein the entities may correspond to persons, equipment, or some other type of entity.

As vertices are generated from the unique attributes, connect module 623 directs processing system 650 to identify when vertices are related or associated with other vertices for the same entity based on relationships identified in rows of the databases. When attribute vertices are associated, connect module 623 may connect the vertices using a shared entity vertex representative of the entity. If other associated attributes are not identified in the databases, then connect module 623 may connect the single entity vertex representative of the entity.

In some implementations, when an entity vertex is generated, data may be stored with the entity vertex, wherein the data may comprise attributes associated with the particular entity. The attributes may comprise attributes for the attribute types of interest (or unique attribute types) and may further include supplemental attributes that may not be unique to the particular entity.

Once graph 640 is generated, queries may be generated to the graph, wherein the queries may include attributes associated with the attribute types of interest. In response to the queries, computing system 600 may respond to the queries by traversing the attribute vertices to efficiently identify entities required for the query. By implementing the attribute vertices associated with specific attribute types of interest, entities may be efficiently identified in a graph using various identifier types. Thus, although a first identifier may be unknown to a user generating a query, a second identifier may be used to identify the required entity within graph 640.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying a request to generate a graph from a plurality of databases, wherein the plurality of databases indicate a plurality of attributes associated with a plurality of entities, and wherein a first database of the plurality of databases indicates a first set of attributes in the plurality of attributes that is different than a second set of attributes in a second database of the plurality of databases;
   in response to the request, identifying attribute types of interest in the plurality of databases that correspond to unique identifier types for the plurality of entities;
   for each attribute type of interest of the attribute types of interest, generating a vertex in the graph for each unique attribute identified in the plurality of databases for the attribute type of interest, wherein the unique attribute uniquely identifies an entity of the plurality of entities;
   for each vertex in the graph:
      determining whether the vertex is associated with one or more other vertices of the vertices generated for the unique attributes based on associations of the unique attribute for the vertex with other unique attributes of the unique attributes in the plurality of databases;
      in response to determining that the vertex is associated with one or more other vertices, connecting the vertex with the one or more other vertices using an entity vertex representative of an entity of the plurality of entities; and
      in response to determining that the vertex is not associated with one or more other vertices, generating an entity vertex representative of an entity of the plurality of entities and connecting the vertex to the entity vertex;
   obtaining a query, wherein the query indicates a unique attribute of the unique attributes;
   identifying at least one vertex in the graph that shares an entity vertex with the vertex for the unique attribute indicated in the query; and
   generating a response to the query based on at least one unique attribute corresponding to the at least one vertex.

2. The method of claim 1, wherein the attribute types of interest comprise unique identifier types for the plurality of entities.

3. The method of claim 1, wherein the entities comprise users or employees of an organization.

4. The method of claim 1 further comprising:
   for each of the attribute types of interest, traversing the plurality of databases to identify said each unique attribute for the attribute type of interest.

5. The method of claim 1, wherein identifying whether the vertex is associated with one or more other vertices based on associations in the plurality of databases comprises:
   identifying at least one row in at least one database of the plurality databases that contained the attribute associated with the vertex;
   identifying whether the vertex is associated with one or more other vertices based on whether one or more other vertices correspond to one or more other attributes in the at least one row.

6. The method of claim 1 further comprising identifying other attributes associated with each of the entities and storing the other attributes with a corresponding entity vertex.

7. A computing apparatus comprising:
   one or more non-transitory computer readable storage media;
   a processing system operatively coupled to the one or more non-transitory computer readable storage media; and
   program instructions stored on the one or more non-transitory computer readable storage media that, when executed by the processing system, direct the processing system to:
      identify a request to generate a graph from a plurality of databases, wherein the plurality of databases indicate a plurality of attributes associated with a plurality of entities, and wherein a first database of the plurality of databases indicates a first set of attributes in the plurality of attributes that is different than a second set of attributes in a second database of the plurality of databases;
      in response to the request, identify attribute types of interest in the plurality of databases that correspond to unique identifier types for the plurality of entities;
      for each attribute type of interest of the attribute types of interest, generate a vertex in the graph for each unique attribute identified in the plurality of databases for the attribute type of interest, wherein the unique attribute uniquely identifies an entity of the plurality of entities;
      for each vertex in the graph:
         determine whether the vertex is associated with one or more other vertices of the vertices generated for the unique attributes based on associations of the unique attribute for the vertex with other unique attributes of the unique attributes in the plurality of databases;

in response to determining that the vertex is associated with one or more other vertices, connect the vertex with the one or more other vertices using an entity vertex representative of an entity of the plurality of entities; and in response to determining that the vertex is not associated with one or more other vertices, generate an entity vertex representative of an entity of the plurality of entities and connecting the vertex to the entity vertex;

obtain a query, wherein the query indicates a unique attribute of the unique attributes;

identify at least one vertex in the graph that shares an entity vertex with the vertex for the unique attribute indicated in the query; and generate a response to the query based on at least one unique attribute corresponding to the at least one vertex.

8. The computing apparatus of claim 7, wherein the attribute types of interest comprise unique identifier types for the plurality of entities.

9. The computing apparatus of claim 7, wherein the entities comprise users or employees of an organization.

10. The computing apparatus of claim 7, wherein the program instructions further direct the processing system to, for each of the attribute types of interest, traverse the plurality of databases to identify said each unique attribute for the attribute type of interest.

11. The computing apparatus of claim 7, wherein identifying whether the vertex is associated with one or more other vertices based on associations in the plurality of databases comprises:

identifying at least one row in at least one database of the plurality databases that contained the attribute associated with the vertex;

identifying whether the vertex is associated with one or more other vertices based on whether one or more other vertices correspond to one or more other attributes in the at least one row.

12. The computing apparatus of claim 7, wherein the program instructions further direct the processing system to identify other attributes associated with each of the plurality of entities and store the other attributes with a corresponding entity vertex.

13. The computing apparatus of claim 7 further comprising a graph storage system for the graph.

14. An apparatus comprising:

one or more non-transitory computer readable storage media;

program instructions stored on the one or more non-transitory computer readable storage media that, when executed by a processing system, direct the processing system to identify a request to generate a graph from a plurality of databases, wherein the plurality of databases indicate a plurality of attributes associated with a plurality of entities, and wherein a first database of the plurality of databases indicates a first set of attributes in the plurality of attributes that is different than a second set of attributes in a second database of the plurality of databases;

in response to the request, identify attribute types of interest in the plurality of databases that correspond to unique identifier types for the plurality of entities;

traverse the plurality of databases to identify unique attributes for each of the attribute types of interest, wherein each of the unique attributes uniquely identify an entity of the entities;

generate a vertex in the graph for each of the unique attributes;

for each vertex in the graph:

determine whether the vertex is associated with one or more other vertices of the vertices generated for the unique attributes based on associations of the unique attribute for the vertex with other unique attributes of the unique attributes in the plurality of databases;

in response to determining that the vertex is associated with one or more other vertices, connect the vertex with the one or more other vertices using an entity vertex representative of an entity of the plurality of entities; and in response to determining that the vertex is not associated with one or more other vertices, generate an entity vertex representative of an entity of the plurality of entities and connecting the vertex to the entity vertex;

obtain a query, wherein the query indicates a unique attribute of the unique attributes;

identify at least one vertex in the graph that shares an entity vertex with the vertex for the unique attribute indicated in the query; and generate a response to the query based on at least one unique attribute corresponding to the at least one vertex.

15. The apparatus of claim 14, wherein the attribute types of interest comprise unique identifier types for the plurality of entities.

16. The apparatus of claim 14, wherein the entities comprise users or employees of an organization.

17. The apparatus of claim 14, wherein the program instructions further direct the processing system to identify other attributes associated with each of the plurality of entities and store the other attributes with a corresponding entity vertex.

* * * * *